United States Patent [19]

Wolter

[11] Patent Number: 5,386,331
[45] Date of Patent: Jan. 31, 1995

[54] LOAD BEAM AND FLEXURE ASSEMBLY HAVING FLEXIBLE ARMS WITH SPECIFIC WIDTH RATIOS

[75] Inventor: Raymond R. Wolter, Hutchinson, Minn.

[73] Assignee: Hutchinson Technology Incorporated, Hutchinson, Minn.

[21] Appl. No.: 968,170

[22] Filed: Oct. 29, 1992

Related U.S. Application Data

[63] Continuation-in-part of Ser. No. 693,858, Apr. 29, 1991, Pat. No. 5,291,359.

[51] Int. Cl.⁶ ............................................... G11B 5/48
[52] U.S. Cl. ..................................................... 360/104
[58] Field of Search ................. 360/104, 105, 106, 103

[56] References Cited

U.S. PATENT DOCUMENTS

| | | | |
|---|---|---|---|
| 4,724,500 | 2/1988 | Dalziel | 360/104 |
| 4,853,812 | 8/1989 | Daito et al. | 360/104 |
| 4,875,121 | 10/1989 | Tanaka et al. | 360/105 |
| 4,992,898 | 2/1991 | Wanlass | 360/104 |
| 5,008,768 | 4/1991 | Carlson et al. | 360/104 |
| 5,014,144 | 5/1991 | Sato et al. | 360/104 |
| 5,021,907 | 6/1991 | Zak | 360/104 |
| 5,034,837 | 7/1991 | Schmitz | 360/105 |
| 5,079,660 | 1/1992 | Yumura et al. | 360/104 |
| 5,107,383 | 4/1992 | Takeuchi et al. | 360/104 |
| 5,138,507 | 8/1992 | Zarouri et al. | 360/104 |

FOREIGN PATENT DOCUMENTS

| | | | |
|---|---|---|---|
| 0155746 | 9/1985 | European Pat. Off. | 360/104 |
| 1-107383 | 4/1989 | Japan | 360/104 |
| 01-245478 | 9/1989 | Japan | 360/103 |

*Primary Examiner*—John H. Wolff
*Assistant Examiner*—Craig A. Renner
*Attorney, Agent, or Firm*—Faegre & Benson

[57] ABSTRACT

An improved head suspension assembly for a rotary actuator drive system employs a flexure having flexible arms formed to specific novel width ratios along the length of the arms. The novel width ratios are obtained by broadening portions of the flexible arms. The head suspension assembly demonstrates improved characteristics in lateral stiffness, pitch and roll stiffnesses, and natural frequency.

2 Claims, 8 Drawing Sheets

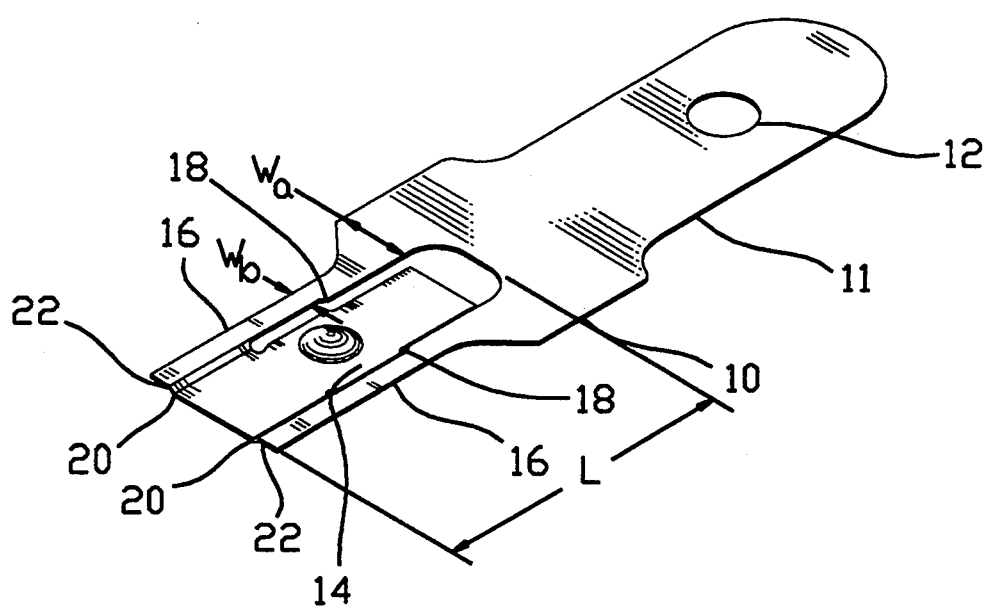
FIG. 1.1

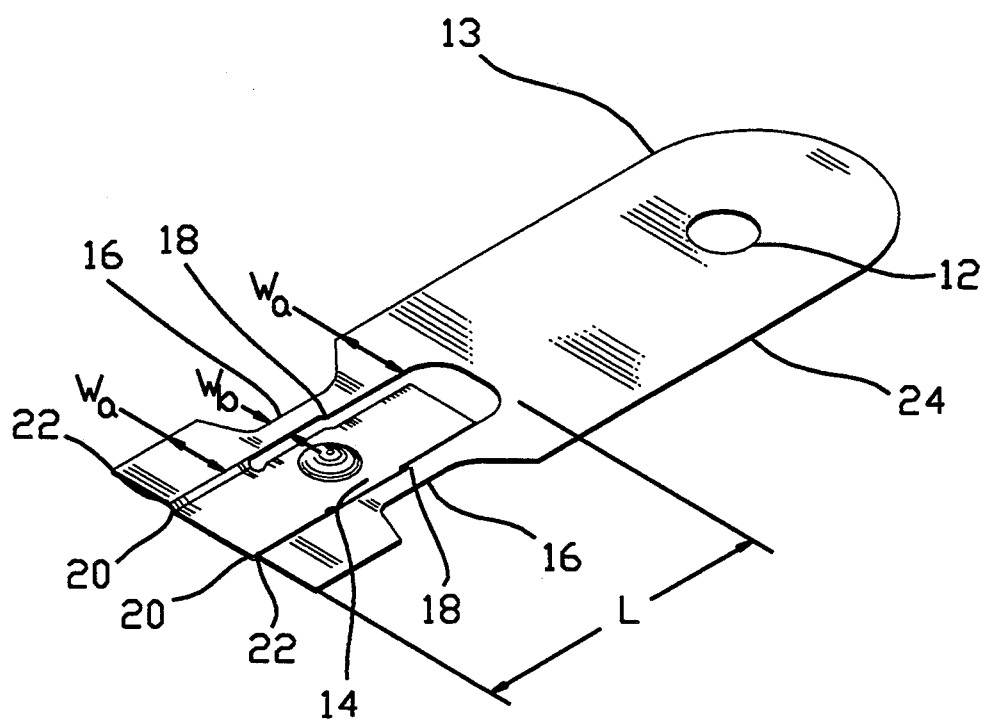
FIG. 1.2

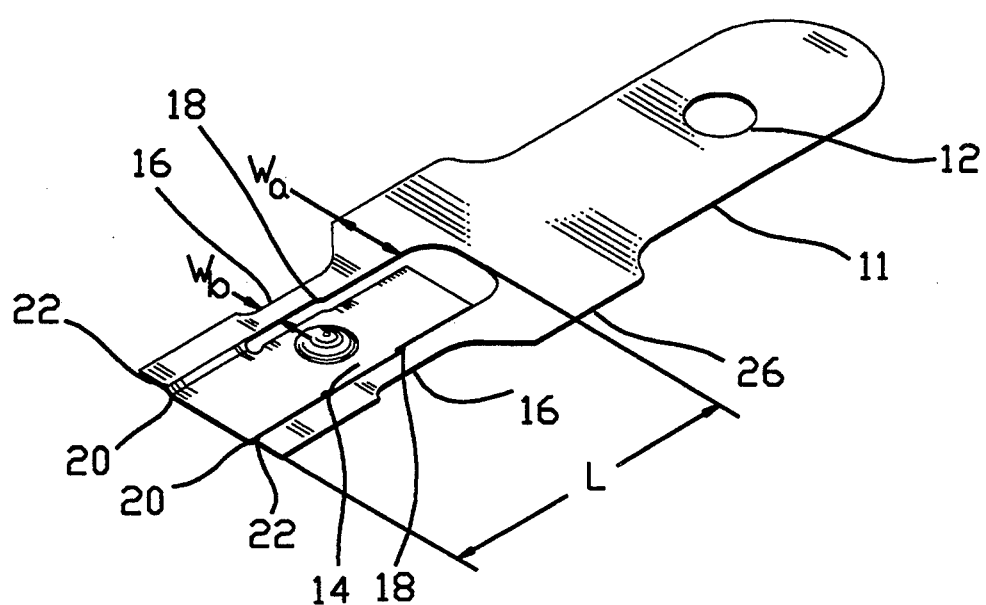
FIG. 1.3

LOAD BEAM AND FLEXURE ASSEMBLY HAVING FLEXIBLE ARMS WITH SPECIFIC WIDTH RATIOS

CROSS-REFERENCE TO RELATED APPLICATION

This application is a continuation-in-part of my copending commonly assigned application Ser. No. 07/693,858, filed Apr. 29, 1991, now U.S. Pat. No. 5,291,359, issued Mar. 1, 1994

BACKGROUND OF INVENTION

1. Field of the Invention

The present invention relates generally to an improved magnetic head suspension assembly (HSA). The HSA is a component within a disk drive which orients a magnetic read/write head over the desired position on the storage media from which information is to be accessed or to which it is to be transferred. More specifically, the invention relates to a load beam and flexure assembly in which the flexure arms are formed to specific novel width ratios. The load beam and flexure assemblies of the present invention demonstrate specific improvements, such as increased lateral stiffness without substantial change to the pitch and roll stiffnesses, reduced pitch and roll stiffnesses without substantial change to the lateral stiffness, and decreased pitch and roll stiffnesses with increased lateral stiffness of the flexure as compared to prior art assemblies.

2. Description of the Prior Art

With the advent of more powerful computers and the rapid growth in the personal computer market, it has become increasingly more important to enable a user to access data from storage devices with increased speed and accuracy.

Because there is a need to reduce access times to enable rapid retrieval of data, it has become increasingly more important to reduce undesirable levels of vibration of components within the rigid disk drive. Vibration of drive components can cause instability of the drive's servo system. It also may delay the transfer of data, because data can not be confidently transferred until the amplitude of the vibration has substantially decayed. The current invention addresses this problem by providing flexures, load beams, and flexure and load beam assemblies of specific geometry to selectively increase lateral stiffness and/or reduce pitch and roll stiffnesses of the HSA to meet the needs of particular usages and environments.

In terms of the dynamic characteristics of head suspension assemblies, higher vibration amplitudes or gains are more acceptable at higher frequencies. Lower spring rates yield better gram stability through stack up tolerances of drive actuator assemblies. A lower flexure and load beam assembly pitch and roll stiffness helps maintain assembly compliance. Increases in flexure lateral stiffness decrease unwanted assembly compliance.

SUMMARY OF THE INVENTION

It is therefore the major object of this invention to provide a head suspension assembly with enhanced performance in lateral stiffness and in pitch and roll stiffnesses.

More specifically, the suspension assembly of the present invention includes a spring load beam element portion joined to the rigid arm at a proximal end thereof for supporting a magnetic head at a fixed distance from the rigid arm, where the flexure comprises a unitary flexure portion mounted on the load beam element at the distal apex thereof and projecting beyond the distal apex of the element and wherein the flexure is divided into a central head mounting support means for receiving a disk drive head to be bonded thereto, and a plurality of slots in the surface of the flexure portion to define at least two extended flexible arms for suspending the head support means from the distal end thereof for gimballed movement relative to the load beam element.

Each flexible arm portion, at the end thereof proximal to the load beam, has a widest width $W_a$, and each flexible arm portion narrows to a narrowest width $W_b$ at a point between the widest width $W_a$ and the distal end of the flexible arm at the distal end of the flexure, such that the ratio of $W_b/W_a$ falls within the range of about 0.2 to 0.8. Flexures of this invention formed with the flexible arms corresponding to these width ratios demonstrate a decrease in pitch and roll stiffnesses and an increase in lateral stiffness and the natural frequency of the flexure.

The invention also includes a magnetic head suspension for attachment to a rigid arm, where the head suspension includes a spring load beam element portion joined to the arm at a proximal end thereof, a unitary flexure portion mounted on the load beam element at the distal end thereof, with the flexure formed, at the flexure end proximal to the load beam, with stiffening side rails positioned along the flexure side edges to prevent the ramp used in a head lifter of the disk drive from contacting the etched edge of the flexure. The load beam may have its distal end relieved to form rail receiving relief areas, to permit the surface of the flexure to be flushly aligned with the surface of the load beam element, with the flexure side rails projecting into the rail means receiving relief areas.

These and other objects of the present invention will be apparent with reference to the drawings, the description of the preferred embodiment, and the claims.

BRIEF DESCRIPTION OF THE DRAWINGS

FIG. 1.1 is a perspective view of a first flexure formed in accordance with the present invention;

FIG. 1.2 is a perspective view of a second flexure formed in accordance with the present invention;

FIG. 1.3 is a perspective view of a third flexure formed in accordance with the present invention;

DETAILED DESCRIPTION OF THE DRAWING

Figure 2:
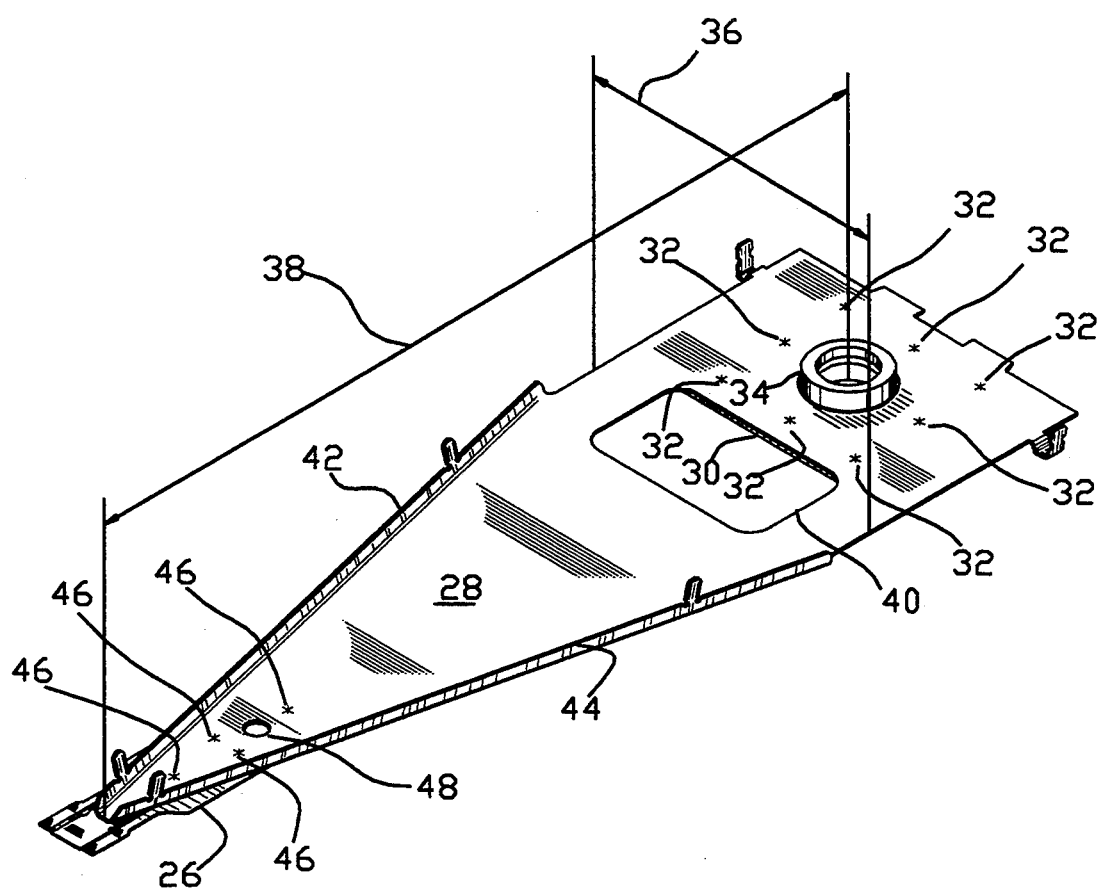
FIG. 2 is a perspective view of a head support assembly utilizing the flexure of FIG. 1.3 in accordance with the present invention.

FIGS. 1.1, 1.2 and 1.3 show embodiments of flexures 10, 24 and 26 in accordance with the present invention. In FIG. 1.1, flexure 10 is shown provided with tooling hole 12 to assist in location of flexure 10 to the load beam element and in later assembly of the disk drive head. Flexure 10 includes central head mounting support means 14, to which a disk drive head is to be bonded, and which is separated from the body of flexure 10 by cut-outs forming flexible arms 16. As shown in FIG. 1.1, central head mounting support means 14 is depressed from the level of the body of flexure 10 by form lines 20 and 22. Flexible arms 16 connect, at the extreme distal end of flexure 10, to central head mounting support means 14. Each flexible arm 16, at the end thereof proximal to the load beam, has a widest width $W_a$. The width of each flexible arm 16 is reduced at a cut-out in the outward facing edge of each flexible arm 16 and at notch 18 at the inward facing edge of each flexible arm 16 to a narrowest width $W_b$, such that the ratio of $W_b/W_a$ falls within the range of about 0.2 to 0.8. Note also that proximal end 11 of flexure 10, facing toward the load beam, is of reduced width as compared to the portion of flexure 10 which includes the widest width $W_a$ of flexible arms 16.

In FIG. 1.2, flexure 24 is shown provided with tooling hole 12, central head mounting support means 14, and flexible arms 16. As shown in FIG. 1.2, central head mounting support means 14 is depressed from the level of the body of flexure 10 by form lines 20 and 22. Each flexible arm 16, at the end thereof proximal to the load beam, has a widest width $W_a$. The width of each flexible arm 16 is reduced by a cut-out in the outward facing edge of each flexible arm 16 and at notch 18 at the inward facing edge of each flexible arm 16 to a narrowest width $W_b$, such that the ratio of $W_b/W_a$ falls within the range of about 0.2 to 0.8. Flexible arms 16 connect, at the extreme distal end of flexure 10, to central head mounting support means 14, and are again widened at that point to the widest width $W_a$. Note that the proximal end 13 of flexure 24 remains of the same width as the portion of the flexure at which the width $W_a$ of flexible arms 16 is measured.

In FIG. 1.3, flexure 26 is shown provided with tooling hole 12, central head mounting support means 14, and flexible arms 16. As shown in FIG. 1.3, central head mounting support means 14 is depressed from the level of the body of flexure 10 by form lines 20 and 22. Each flexible arm 16, at the end thereof proximal to the load beam, has a widest width $W_a$. The width of each flexible arm 16 is reduced by a cut-out in the outward facing edge of each flexible arm 16 and at notch 18 at the inward facing edge of each flexible arm 16 to a narrowest width $W_b$ to lower the pitch and roll flexure stiffness, such that the ratio of $W_b/W_a$ falls within the range of about 0.2 to 0.8. Flexible arms 16 connect, at the extreme distal end of flexure 26, to central head mounting support means 14, and are again widened at that point to a width intermediate between the narrowest width $W_b$ and the widest width $W_a$. Note also that the proximal end of flexure 26 is of reduced width as compared to the portion of flexure 26 which includes widest width $W_a$ of flexible arms 16.

Figure 3:
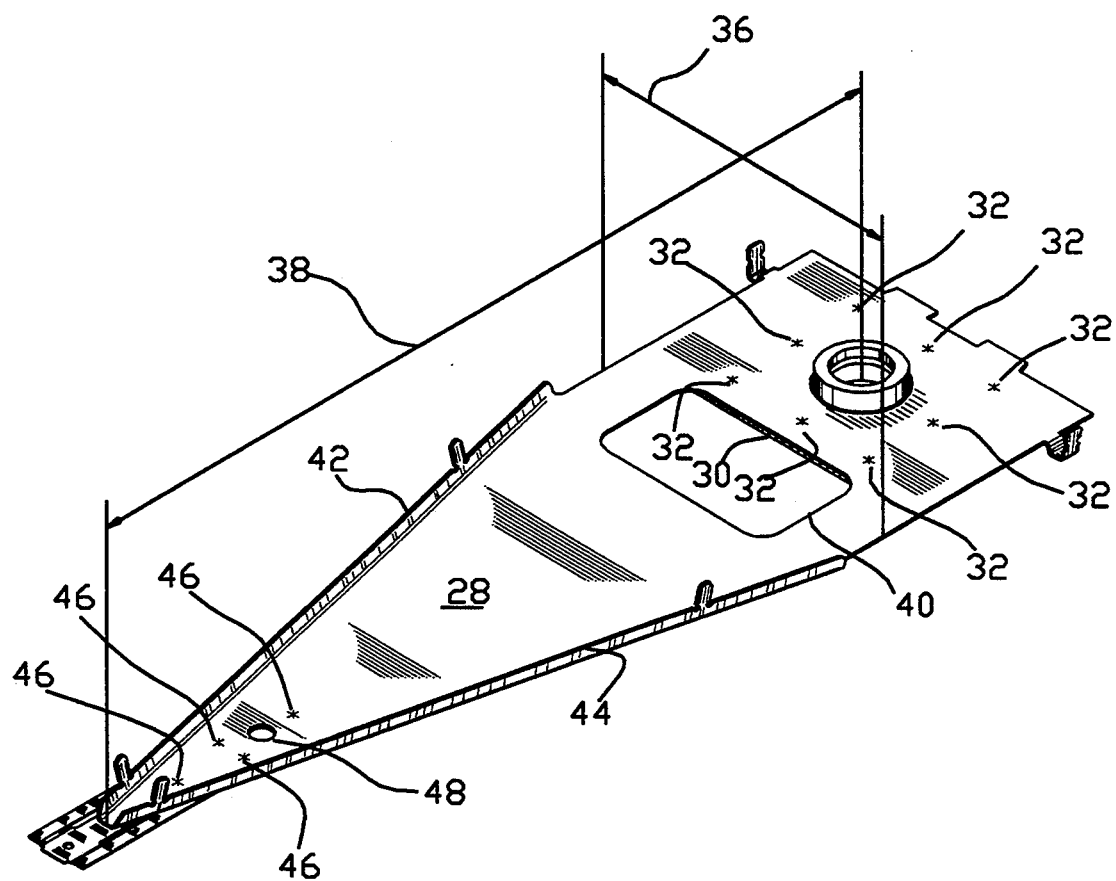
FIG. 3 is a perspective view of a prior art flexure in assembly with a load beam, in which the load beam is the same as that shown in FIG. 2.

Note that the relative widths of the flexible arms are as measured over the length L of the arms, as illustrated in FIGS. 1.1, 1.2 and 1.3. In describing the length L of the arms, the standard length in a prior art flexure, as illustrated in FIG. 3, is 4.47 mm. According to the present invention, the length L of the arms can range from 1.25–4.3 mm. Note also that the narrowest width $W_b$ of each flexible arm is formed in an area adjacent the load beam dimple. In the prior art flexure, as shown in FIG. 3, similar flexible arms do not have a proximal increase in the width of the arms and the arms are relatively narrower. In the FIG. 3 prior art flexure, $W_b=W_a=356$ micrometers, so that the ratio of $W_b/W_a=1.0$. In flexures according to the present invention, $W_b$ can range from 250–760 micrometers and $W_a$ can range from 300–1,150 micrometers, and the ratio of $W_b/W_a$ must be in the range of 0.2 through 0.8.

It will be obvious that the flexures 10 and 26 may also be formed with a widened proximal end, as illustrated for proximal end 13 of flexure 24 in FIG. 1.2. Alternatively, flexure 24 may also be formed with a narrowed proximal end, as illustrated for proximal end 11 of flexures 10 and 26 in FIGS. 1.1 and 1.3.

In FIG. 2, as well as in prior art FIG. 3, spring load beam element 28 is shown, having means at the proximal end thereof for joining load beam element 28 to the rigid arm in the disk drive. For example, in FIG. 2, as well as in prior art FIG. 3, a base plate 30 is welded by a series of conventional welds 32 to the proximal end of load beam element 28. Base plate 30 includes swaging boss 34 which projects through the surface of load beam element 28 and is used to attach load beam element 28 to a rigid arm in the disk drive.

Reference line 36, in both FIGS. 2 and 3, illustrates the width of the proximal end of load beam element 28 and reference character 38 is used to designate the length of load beam element 28 from the center line of the point of attachment to the rigid arm to the distal extremity of load beam element 28. In the embodiment shown in FIG. 2, as well as in the prior art FIG. 3, length 38 is taken from the distal tip of the load beam element to the center of swaging boss 34.

In order to tune or adjust the spring characteristics of load beam element 28, aperture 40 can be cut from a portion of the face of load beam element 28. Removal of the material in aperture 40 changes the spring rate stiffness of the suspension in the region between base plate 30 and the stiffened portion of the load beam element between side rails 42 and 44. In this manner, the spring rate of the suspension can be made, if desired, to be comparable with that of prior art suspensions, despite the stiffness otherwise contributed by the increased relative width of the suspension.

In the embodiment shown in FIG. 2, flexure 26, more completely illustrated in FIG. 1.3, is welded to load beam element portion 28 by a series of welds 46. Tooling hole 12 in the surface of flexure 10 is aligned with similar tooling hole 48 in spring load beam element 28 to assist in assembly of flexure 10 and load beam element 28 and in the later assembly of the disk drive.

Figure 4:
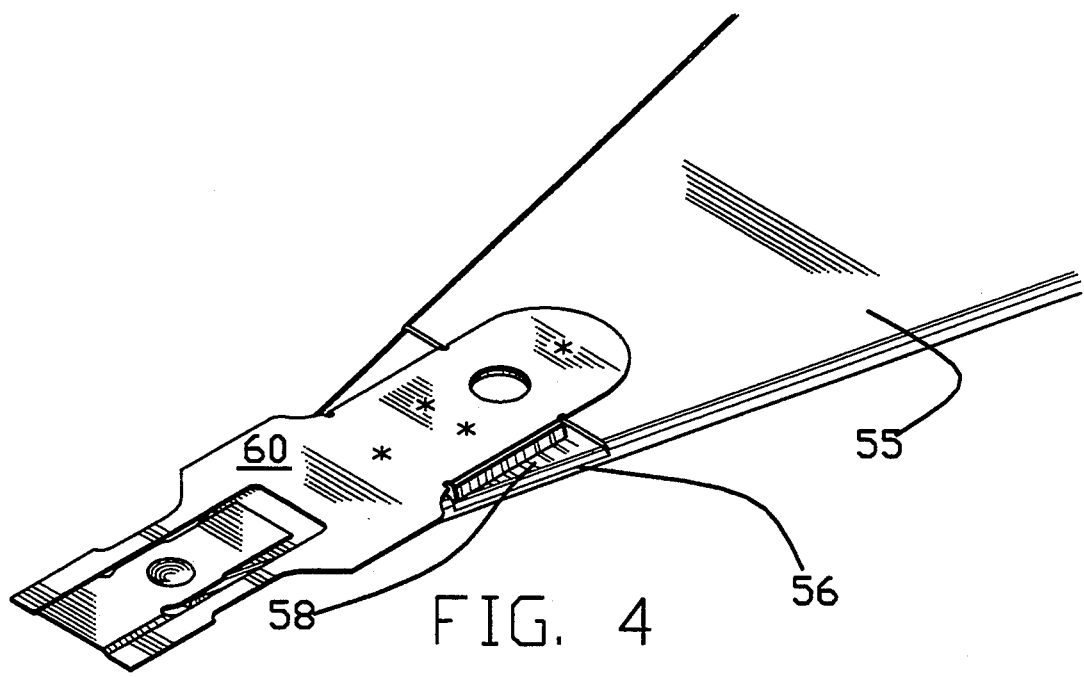
FIG. 4 is a perspective view of a further embodiment of a flexure of the present invention formed with stiffening side rails mounted at the distal end of a load beam, which has relief areas to receive the flexure side rails.

FIG. 4 shows an alternative embodiment of load beam element 55, wherein distal apex portion 56 of load beam element 55 is relieved by a further embossing step to form rail means receiving indentations 58. This permits the surface of alternative flexure means 60 to be flushly aligned with the surface of load beam element 55, with stiffening side rails 62 of flexure 60 projecting into rail means receiving indentations 58. The stiffening side rails 62 are formed by a single bending at form line 63, so that side rails 62 project below the surface of flexure means 60 toward load beam element 55 but do not project above the surface of flexure means 60. Stiffening side rails 62 are positioned along the side edges of flexure 60 to prevent the ramp used in a head lifter of the disk drive from contacting the etched edge of flexure 60.

Figure 6:
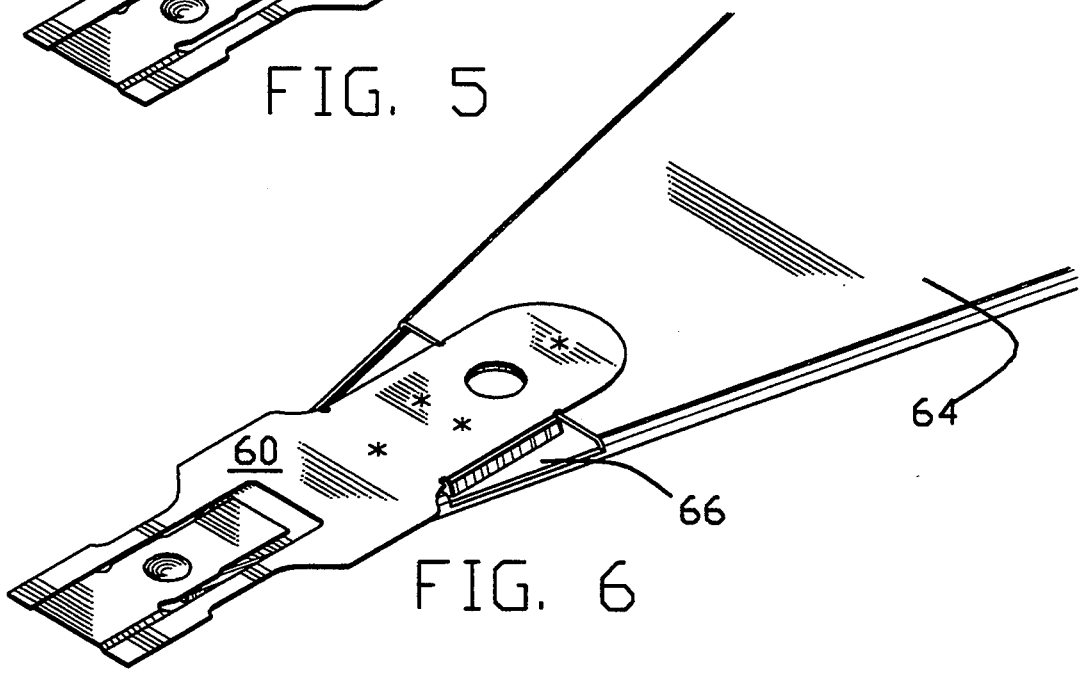
FIG. 6 is a perspective view of a further embodiment showing a flexure of FIGS. 4 and 5 mounted at the distal end of a load beam, which has relief areas removed from the load beam to receive the flexure side rails.

FIG. 6 shows a slightly different form of a modified load beam element where rail means receiving apertures 66 are cut in the distal apex portion of load beam element 64 to accommodate side rails 62 of flexure 60 and to permit rails 62 to project through rail means receiving apertures 66.

Figure 7:
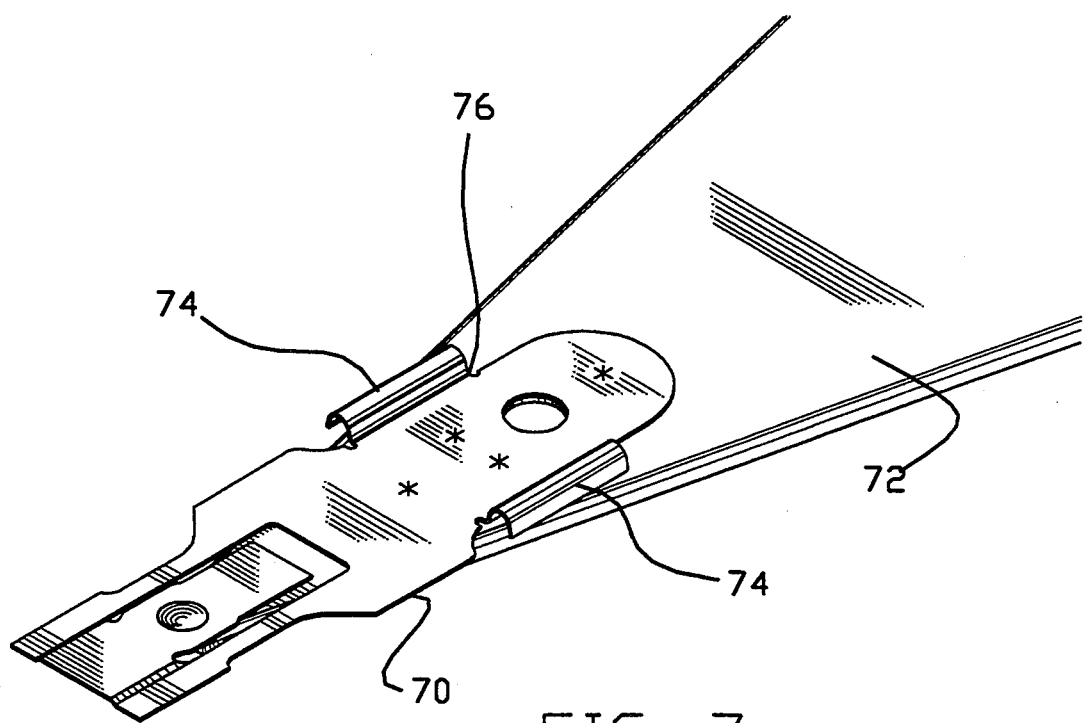
FIG. 7 is yet another embodiment of a flexure of this invention mounted at the distal end of a load beam.
Figure 8:
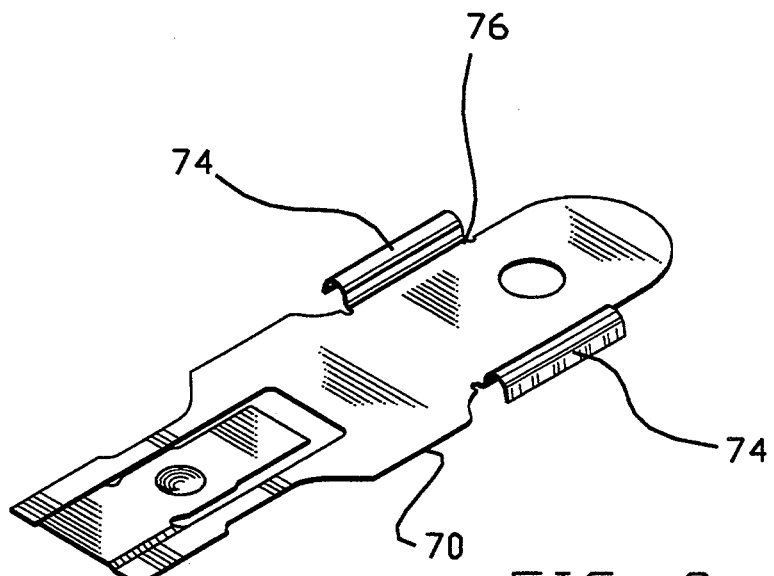
FIG. 8 is a perspective view of the flexure shown in FIG. 7.
Figure 9:
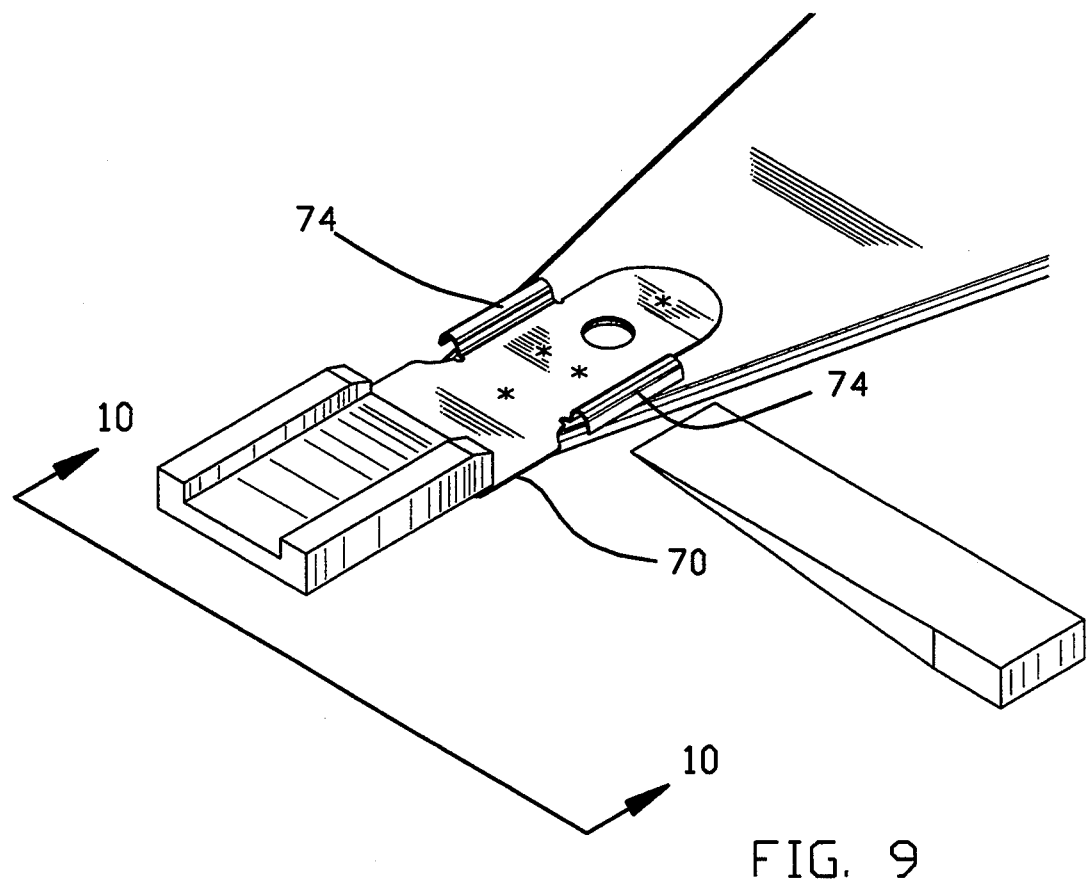
FIG. 9 is a perspective view of a flexure and load beam assembly of FIG. 7, illustrating the position of a read/write head and of a ramp.
Figure 10:
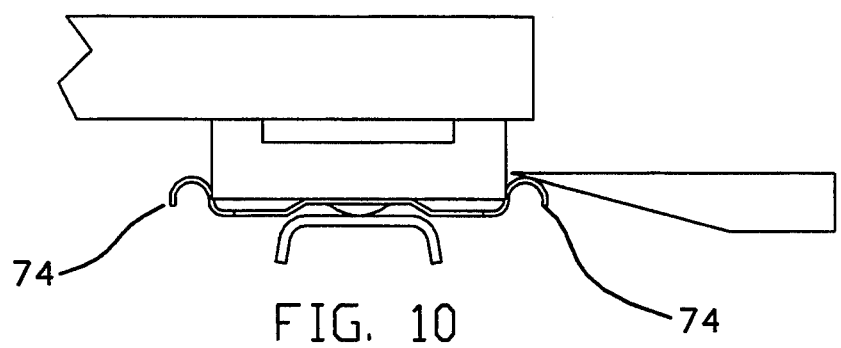
FIG. 10 is a profile view of FIG. 9 taken along the line 10—10, showing the ramp contacting a flexure rail.

FIGS. 7 through 10 show flexure 70, with FIG. 7 showing flexure 70 welded to load beam element 72, in which the distal apex portion of load beam element 72 is not modified by forming or cutting as were load beam elements 55 and 64 shown in FIGS. 4 and 6. Note that side rails 74 are formed by bending at form line 76, so that side rails 74 project above the surface of flexure 70, away from the surface of load beam element 72 and are then bent or rolled downward to terminate, such that side rails 74 permit flexure 70 to be flushly aligned with the surface of load beam element 72. Flexure 70 can thus be utilized without the necessity of modifying load beam element 72, as illustrated in FIGS. 4 and 6. Side rails 74 prevent the ramp used in the head lifter of the disk drive from contacting the etched edge of flexure 70, as illustrated in FIGS. 9 and 10.

Figure 5:
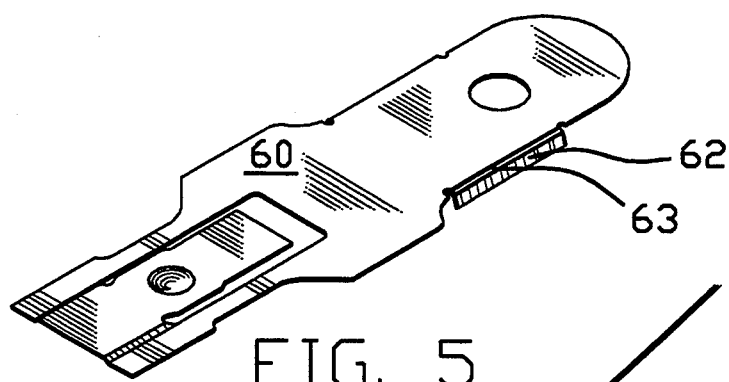
FIG. 5 is a perspective view of the flexure shown in FIG. 4.

It will be obvious that any of flexures 10, 24 and 26, illustrated in FIGS. 1.1, 1.2 and 1.3, preferably when suitably narrowed at the proximal portion of the flexure in the manner shown specifically for flexures 10 and 26, may be further formed with side stiffening rails 62, as illustrated in FIGS. 4–6, or side stiffening rails 74, as illustrated in FIGS. 7 and 8.

Each of the side rails 62 and 74 are designed to form a surface projecting from the respective flexure constructed and arranged for interfacing with a ramp structure in a disk drive in order to move a read/write head away from the surface of the disk when the ramp engages the side rails 62 or 74. FIG. 9 is a perspective view of a flexure and load beam assembly of FIG. 7, illustrating the position of a read/write head and of a ramp. FIG. 10 is a profile view of FIG. 9 taken along the line 10—10 showing the ramp contacting the flexure rails 74.

All of the flexures of the present invention are preferably formed of 300 series stainless steel, and their normal thickness is generally in the range of 25 to 50 micrometers.

The present load beam and flexure assemblies demonstrate distinct advantages in performance over similar assemblies of the prior art. The following modeling test results are presented demonstrating lower pitch and roll stiffnesses, higher lateral stiffness and higher frequencies for the present assemblies as compared to a representative prior art assembly. In the data presented in the Modeling Test Results below, the flexure referred to as "Prior Art" was prepared according to the illustration provided in FIG. 3, in which $W_b = W_a = 356$ micrometers, so that the ratio of $W_b/W_a = 1.0$. The flexures referred to as "New Flexure" and "2nd New Flexure" were both prepared according to the illustration provided in FIG. 1.3, but with two different $W_b/W_a$ ratios. For the "New Flexure", $W_b = 0.33$ mm and $W_a = 0.515$ mm, so that the ratio of $W_b/W_a = -0.641$. For the "2nd New Flexure", $W_b = 0.33$ mm and $W_a = 0.619$ mm, so that the ratio of $W_b/W_a = 0.533$. All of the flexures were formed of 300 series stainless steel.

Modeling Test Results I
Lower Pitch and Roll Stiffnesses

| Flexure | Pitch (mN-mm/deg.) | Roll (mN-mm/deg.) | Wb/Wa |
|---|---|---|---|
| Prior Art | 2.6 | 4.8 | 1 |
| New Flexure | 2.4 | 3.46 | 0.641 |
| 2nd New Flexure | 2.49 | 3.55 | 0.533 |

Modeling Test Results II
Higher Lateral Stiffness

| Flexure | Lateral Stiff. (N/mm) | Wb/Wa |
|---|---|---|
| Prior Art | 8.1 | 1 |
| New Flexure | 23.8 | 0.641 |
| 2nd New Flexure | 27.8 | 0.533 |

Modeling Test Results III
Higher Frequencies

| Flexure | Sway Mode | 1st Bending | 1st Torsion | 2nd Torsion | 2nd Bending |
|---|---|---|---|---|---|
| Prior Art | 3586 | 10003 | 10555 | 18066 | 19102 |
| New Flexure | 6422 | 13728 | 13787 | 24793 | 28055 |
| % Increase over Prior Art | 79 | 37 | 31 | 37 | 47 |
| 2nd New Flexure | 5880 | 13442 | 13514 | 25924 | 26634 |
| % Increase over Prior Art | 64 | 34 | 28 | 43 | 39 |

Further, the embodiments described above are by no means limited, and various changes and modifications are possible without departing from the scope and spirit of the invention as defined by the following claims.

What is claimed is:

1. In a magnetic head suspension for a rotary actuator drive including a load beam joined to a proximal end of a rigid arm for supporting a magnetic head at a fixed distance from the rigid arm:

a flexure mounted on a distal apex of the load beam, the flexure being divided into a central head mounting support means for receiving the magnetic head to be bonded thereto;

a pair of slot-like segments in the flexure to define at least two extended flexible arms, such that the slot-like segments and the flexible arms, respectively, are generally longitudinally aligned parallel to a longitudinal axis of symmetry of the flexure, said arms suspending the support means from a distal end of the flexure for gimballed movement of the magnetic head relative to the load beam, a proximal end of each flexible arm having a widest width $W_a$, each flexible arm narrowing to a narrowest width $W_b$, said narrowest width $W_b$ at a point between the widest width $W_a$ and the distal end of the flexure aligned with a dimple on the support means, and a distal end of each flexible arm at the distal end of the flexure having a width intermediate between the widest width $W_a$ and the narrowest width $W_b$, the ratio of $W_b/W_a$ falling within the range of about 0.2 to 0.8, thereby decreasing pitch and roll stiffnesses while increasing lateral stiffness and natural frequency of the flexure; wherein a proximal portion of the flexure is of reduced width as compared to the width of the flexure at the widest width $W_a$ of the flexible arms, such that the reduced width proximal portion of the flexure has generally longitudinally aligned parallel sides.

2. A head suspension according to claim 1, wherein $W_b$ is in the range of about 250–760 micrometers and $W_a$ is in the range of about 300–1150 micrometers.

* * * * *